United States Patent [19]

Shoemaker

[11] Patent Number: 4,838,360

[45] Date of Patent: Jun. 13, 1989

[54] MINIMUM TILLAGE IMPLEMENT

[76] Inventor: Larry N. Shoemaker, P.O. Box 1051, Rayville, La. 71269

[21] Appl. No.: 34,090

[22] Filed: Apr. 2, 1987

[51] Int. Cl.⁴ ............................................ A01B 35/22
[52] U.S. Cl. .................................... 172/176; 172/199; 172/701; 172/730
[58] Field of Search ............... 172/174, 175, 176, 177, 172/199, 730, 732, 733, 383, 701, 701.1, 721, 701.2, 701.3, 703, 704, 734, 735, 736, 508; 111/10

[56] References Cited

U.S. PATENT DOCUMENTS

| | | | |
|---|---|---|---|
| 2,569,464 | 10/1951 | Edwards et al. | 172/551 |
| 2,974,428 | 3/1961 | Krasner | 172/703 |
| 3,112,573 | 12/1963 | Moras et al. | 172/703 |
| 3,815,684 | 6/1974 | Smith | 111/10 |
| 4,781,253 | 11/1988 | Cosson | 172/508 |

OTHER PUBLICATIONS

"New 'Ridge Hugger' Keeps Planter On Row", *Farm Show*, vol. 8, No. 6, p. 27, Nov. 1984.

Primary Examiner—Deborah L. Kyle
Assistant Examiner—J. Woodrow Eldred
Attorney, Agent, or Firm—Keaty & Keaty

[57] ABSTRACT

A minimum tillage implement attaches to the tool bar of a planter device to allow topping of the rows, tilling of the rows, planting and chemical application to be accomplished in a single pass over the rows of a field. The minimum tillage implement comprises a shaper for topping the rows of the field, and a reel for tilling the planting area of the row. Adjacent the top of the shaper is a substantially horizontal, forwardly-projecting lip portion which serves to prevent dirt from going over the top of the shaper. The reel follows the shaper and has a number of blades spaced substantially evenly about a shaft, and has tabs interposed between adjacent blades. The tabs allow the reel to roll as smoothly as if it had twice as many blades, without the clogging that might occur with a reel having so many blades.

7 Claims, 4 Drawing Sheets

MINIMUM TILLAGE IMPLEMENT

BACKGROUND OF THE INVENTION

1. Field of the Invention

The present invention relates to farm implements, and more particularly to a minimum tillage implement to prepares rows in a field for planting.

2. General Background of the Invention

When preparing a field for planting, a farmer usually plows his field, forms the field into rows, tops the rows, tills the rows adjacent the top of the rows, then plants and applies chemicals (fertilizer, herbicides and/or insecticides). Ideally, the soil in the rows is allowed to compact before the rows are topped and minimally tilled before planting-the compacted soil provides a firm base on which the sprouting plants push to "break ground". Usually, the topping and tilling of the rows are done in one pass over the rows, and the planting and chemical application done in another, requiring two separate passes over the rows after the rows have been formed.

Various systems have been proposed to combine the tilling and planting implements such that both operations may be carried out in a single pass.

One such system, disclosed in U.S. Pat. No. 3,815,684, comprises a U-shaped sharper having horizontally extending blades disposed therein, and a planter carried behind the shaper. The leading edge of the shaper shapes the tops of the rows, and the blades pulverize the soil adjacent the tops of the rows. Dirt tends to spill over the top of the shaper, however, clogging the planter wheel and causing the seeds to be planted at uneven depths. Thus, this system has not enjoyed much popularity among farmers.

SUMMARY OF THE INVENTION

The apparatus of the present invention comprises a minimum tillage implement including a shaper, for topping rows in a field, having a means for reducing the tendency of dirt to spill over the top thereof. The apparatus of the present invention also comprises a means for tilling the soil adjacent the top of a row to a predetermined depth. Means are provided to attach the shaper and tiller to a planter bar and to accurately select the depth of topping, the depth of tilling and roll of the shaper.

The shaper has substantially vertical sides, the bottom edges of which scrape the top of a row. The sides are aligned to force the scraped soil off and away from the center of the row, and a lip extending forwardly over the top edge of the sides helps in preventing the dirt from spilling over the top edges of the sides.

The tilling means preferably comprises a reel with blades attached thereto, and is carried behind the shaper. The reel preferably comprises tabs interposed between adjacent blades to allow the reel to roll as smoothly as if it had twice as many blades, without clogging in moist dirt as easily as it would if it had twice as many blades. A planter/chemical applicator is carried behind the apparatus of the present invention; thus, topping of the rows, tilling of the soil adjacent the tops of the rows, planting and chemical application may all be carried out in a single pass, due to the means for reducing the tendency of dirt to spill over the top of the shaper.

It is an object of the present invention to provide a minimum tillage implement, for topping and tilling rows in a field prior to planting, having means to prevent dirt from going over the top of the implement.

It is also an object of the present invention to provide a minimum tillage implement having a shaper and having means to vary the depth of topping, the depth of tilling and roll of the shaper.

Another object of the present invention is to provide a minimum tillage implement having a reel which rolls smoothly but does not clog easily in moist dirt.

BRIEF DESCRIPTION OF THE DRAWINGS

For a further understanding of the nature, objects and advantages of the present invention, reference should be had to the following detailed description, taken in conjunction with the accompanying drawings, in which like reference numerals denote like elements, and wherein.

DETAILED DESCRIPTION OF THE PREFERRED EMBODIMENT

Figure 1:
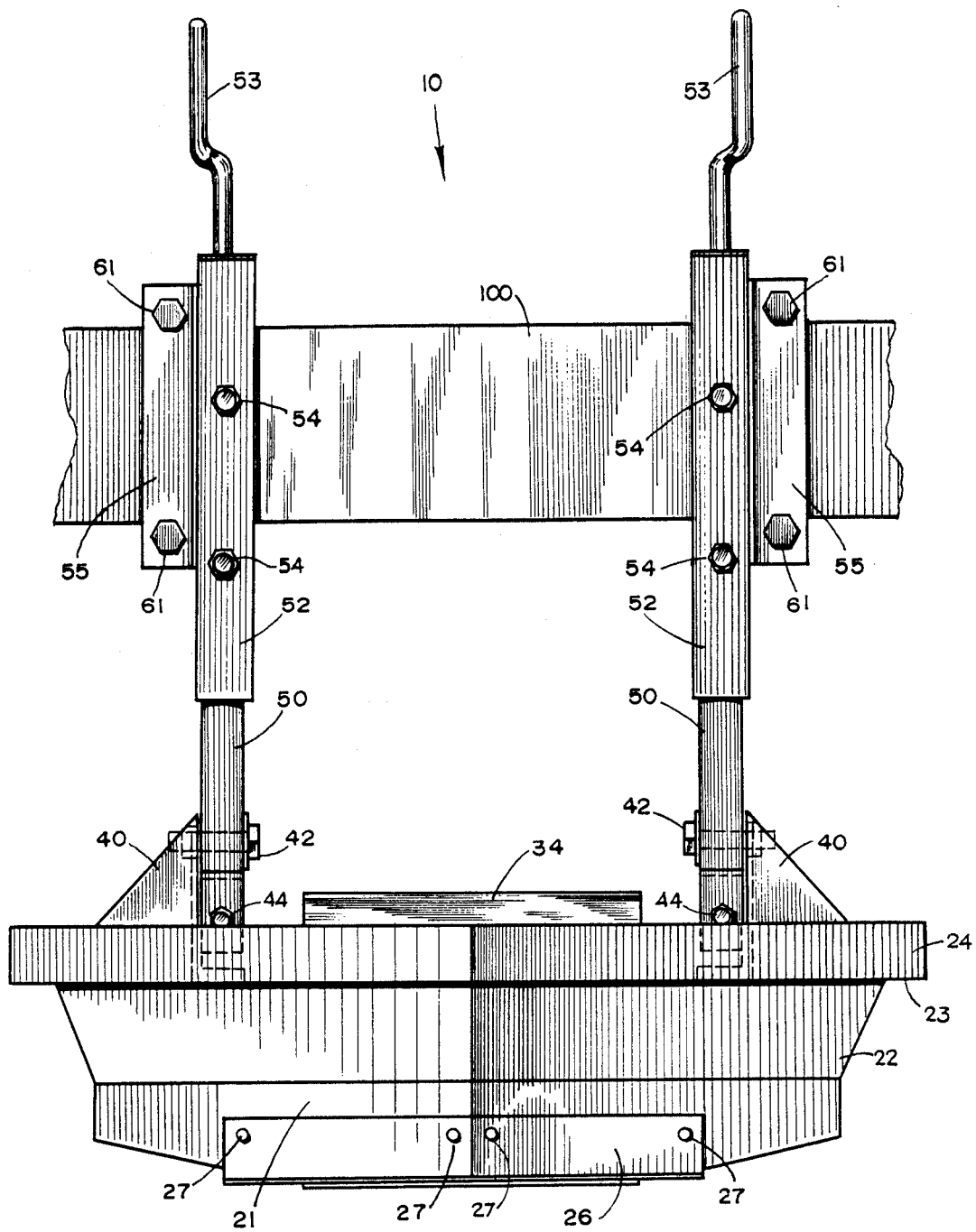
FIG. 1 is a front view of the minimum tillage implement of the present invention.

The preferred embodiment of the present invention, minimum tillage implement 10, is shown in the drawings.

Minimum tillage implement 10 comprises a shaper 20, a reel 30 and means to attach implement 10 to a tool bar 100 (FIG. 1 and 3) of a planter device (not shown).

Figure 3:
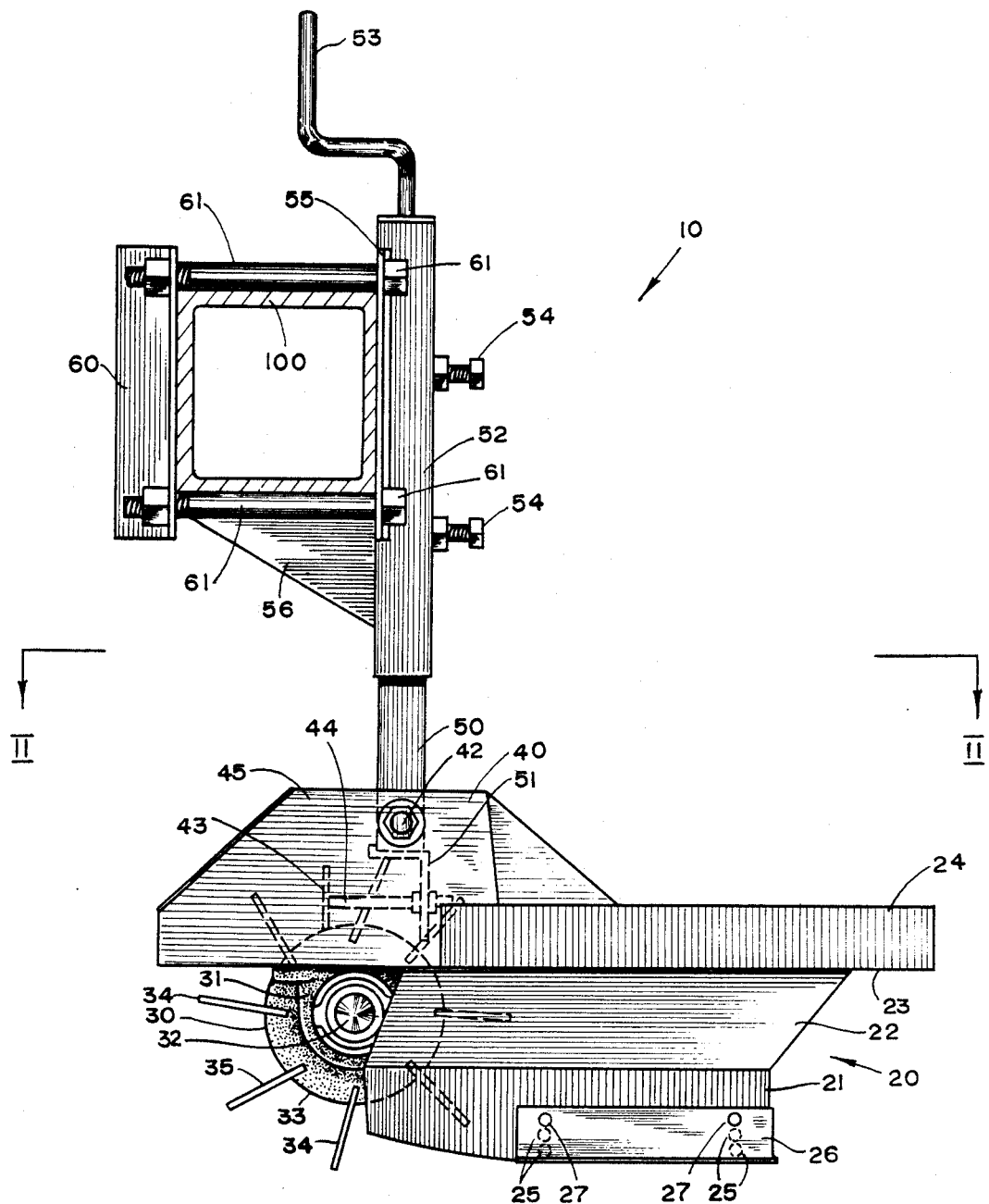
FIG. 3 is a side view of the minimum tillage implement of FIG. 1.
Figure 4:
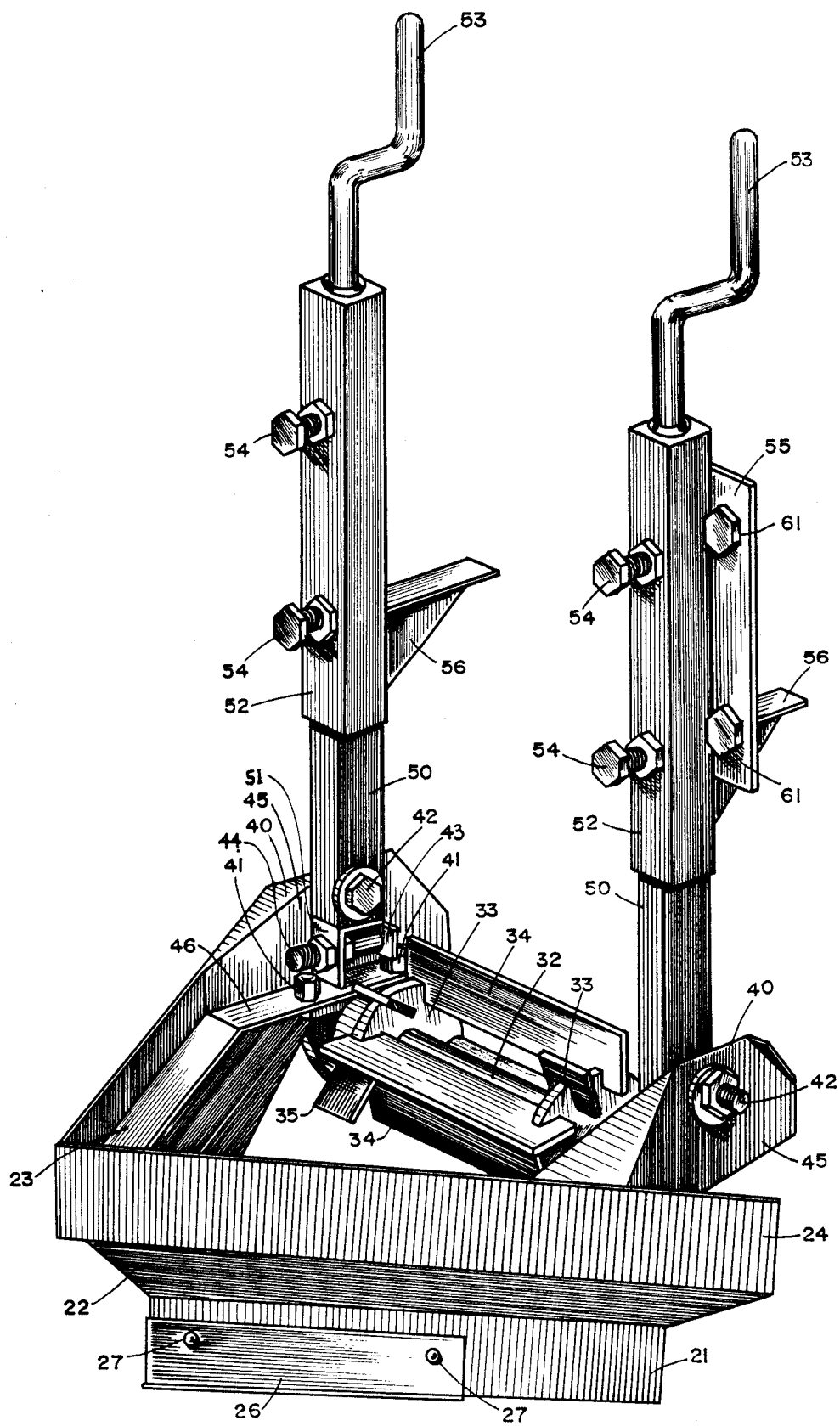
FIG. 4 is a perspective view of the minimum tillage implement of the present invention.

Shaper 20 is a one-piece shaper having a substantially vertical blade portion 21 which is V-shaped in plan, a forwardly slanting dirt-deflecting portion 22, and a substantially horizontal lip portion 23 which projects forwardly above the forwardly-slanting dirt-deflecting portion 22. A rail 24 projects upwardly from the front edge of lip portion 23. Vertical blade portion 21 has a plurality of holes 25 therein (shown in phantom in FIG. 3.) to allow a wear member 26 (FIGS. 1 and 3) to be attached thereto by means such as bolts 27 (FIGS. 1 and 3). Holes 25 allow wear member 26 to be lowered as it wears out. Wear member 26 may comprise a single bar V-shaped in plan or may comprise two bars which are rectangular in elevation.

Figure 2:
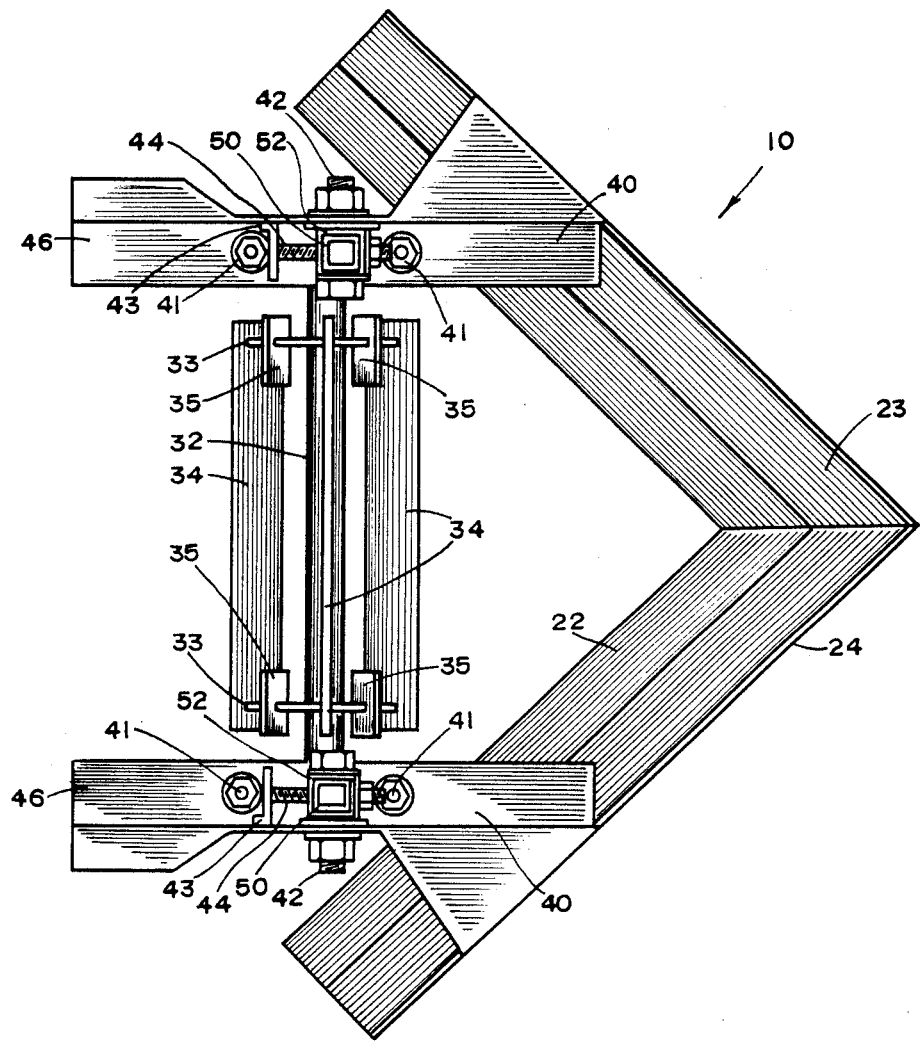
FIG. 2 is a top view of a portion thereof as viewed from the line II—II in FIG. 3.

Support members 40 comprise support plates 45 and support bars 46, and are rigidly attached to shaper 20, such as by welding. Shaft-support bearing blocks 31 (FIG. 3) are attached to support bars 46 with bolts 41 (FIG. 2). A pair of wheels 33 are securely attached to shaft 32 of reel 30, such as by welding. A plurality of blades 34 are rigidly secured to wheels 33, such as by welding, and are spaced substantially evenly about shaft 32. Interposed between adjacent blades 34 are tabs 35, the purpose of which will be explained shortly. Tabs 35 are the same width as, but substantially shorter than, blades 34. In the embodiment shown in the drawings, two tabs 35 are interposed between each pair of adjacent blades 34.

Support plates 45 are pivotally connected to jack members 50 by means of pivot bolts 42. Support tabs 43 are rigidly attached to support plates 45, and each has a threaded bolt 44 securely attached thereto. Bolts 44 pass through slotted holes (not visible in the drawings) in support tabs 51, which are rigidly attached to jack members 50. Support tabs 43 and 51 and bolts 44 provide a means to adjust the pitch of shaper 20.

Jack members 50 are received in sleeve members 52. Jack handles 53 serve the adjust the relative position of each jack member 50 with respect to it respective sleever member 52. Tightening screws 54 serve to releasably secure these positions. A vertical attachment bar 55 is rigidly attached adjacent an upper end of each sleeve member 52. Bolts 61 pass through vertical attachment bars 55 and attachment members 60 (FIG. 3), and serve to secure minimum tillage implement 10 to a tool bar 100 of a planter device (not shown). A bracing member 56 is securely attached to sleeve member 52, and serves to resist upward movement of sleeve 52 relative to tool bar 100 when implement 10 is attached thereto.

In operation, a plurality of minimum tillage implements of the present invention are attached to tool bar 100, one in front of each seeder/chemical applicator (not shown).

Tool bar 100 is lowered such that it contacts bracing members 56. Bolts 61, attachment members 60, and attachment bars 55 are then used to secure tool bar 100 to sleeve member 52. Once minimum tillage implements 10 are attached to tool bar 100, tool bar 100 is positioned at the proper height and yaw for the seeder/chemical applicators. Height of shaper 20 is adjusted by loosening screws 54 and cranking jack handles 53 clockwise or counterclockwise (as viewed from above) depending on whether it is desired to raise or lower shaper 20; adjustment of the height of shaper 20 determines how much of a row will be topped by shaper 20. Roll of shaper 20 is adjusted by using jack handles 53 to raise one jack member 50 higher than the other, if it is desired to carry dirt to one side of the row from the other. Once height and roll of shaper 20 are adjusted properly, screws 54 are tightened to secure the position of jack members 50 relative to sleeve members 52. Pitch of shaper 20 is adjusted by varying the distance between tabs 43 and 51 by means of bolts 44; adjustment of the pitch of shaper 20 determines the depth of pulverization by reel 30. The depth of pulverization may be controlled to a fraction of an inch.

When all desired adjustment have been made, a tractor (not shown) pulls the planter device behind it, with a minimum tillage implement 10 attached to tool bar 100 in front of each seeder/chemical applicator. Were member 26 tops the row, and blade 21 forces dirt and vegetation to the sides of the row. In light soils, such as sand, dirt-deflecting portion 22 is enough to keep dirt from piling up high enough in front of implement 10 to go over the top of shaper 20. In heavier soils, such as those containing clay, dirt-deflecting portion 22 may be sufficient to prevent dirt from piling up high enough to go over the top of shaper 20. In such soils, lip portion 23 causes the dirt to "lay over" on top of itself, preventing it from going over the top of shaper 20. Rail 24 is a stiffener, serving to strengthen shaper 20. Rail 24 can be omitted if shaper 20 is made of a suitably heavy-guage metal.

As shaper 20 tops the row, reel 30 pulverizes the planting area on the row. Tabs 35, interposed between blades 34, allow reel 30 to roll as smoothly as if it had twice as many blades, but does not clog as easily in moist dirt as would a reel having so many blades. Although in the embodiment shown in the drawings two tabs 35 are interposed between each pair of adjacent blades 34, it should be understood that more or less tabs 35 may be present between each pair of adjacent blades 34. When implement 10 is used in soils in which clogging of the blades is minimal, tabs 35 may be replaced with blades.

When properly adjusted, shaper 20 tops the row, forcing dirt and vegetation to the sides of the row, lip 23 preventing dirt (which could otherwise clog the planter wheel of the seeder/chemical applicator and cause the seeds to be planted at uneven depths) from going over the top of shaper 20, and reel 30 tills the planting area to approximately the depth of planting, leaving a firm base upon which emerging plants may push to "break ground". A seeder/chemical applicator (not shown) follows implement 10, planting seeds in the freshly-prepared row and applying chemicals to the planting area alone.

Use of implement 10 of the present invention in conjunction with and simultaneously with a planter device is especially advantageous in that topping, tilling, seed planting and chemical application are done in one pass over a row, minimizing moisture loss of the row between tilling and planting and minimizing the time a farmer spends in the field. Implement 10 succeeds as a topper/minimum tiller for use simultaneously with a planter device where other similar implements have failed primarily because of the provision of lip 23, which helps prevent dirt from going over the top of shaper 20. Thus, it should be understood that the scope of the present invention is not limited solely to the preferred embodiment disclosed and described herein, but that the teaching disclosed herein may be applied to virtually any shaper wherein dirt tends to go over the top of the shaper, by providing a lip thereon. Also, the scope of the present invention is not limited to farm implements, but the teaching hereof may advantageously be applied to other dirt-moving equipment, such as by providing a lip on the blade of a bulldozer. The lip should be long enough to prevent dirt from going over the top of the dirt-moving equipment. The length of the lip may vary depending upon the size and type of the dirt-moving equipment, the type of dirt moving to be performed, and the type and moisture content of the soil. Experimentation can be done to determine the minimum length necessary for particular equipment used to perform a particular job in a particular type of soil. For example, in the preferred embodiment shown in the drawings for topping and tilling a row of a field, it has been found that a lip having a length of one and one-half inches, as measured perpendicularly from the edge of dirt-deflecting portion 22, is sufficient to prevent virtually any type of dirt encountered in a field from going over the top of shaper 20.

Since there are numerous modifications which can be made to the embodiment of the invention disclosed and described herein, I pray that may rights to the present invention be limited only by the following claims.

I claim:

1. A minimum tillage implement comprising:
   a shaper for topping a row of a field, said shaper having a lower portion for engaging a row of a field, and a top edge;
   a lip portion adjacent said top edge of said shaper, said lip portion extending substantially perpendicularly from said top edge and extending forwardly of said shaper a sufficient distance to prevent dirt from going over the top edge of said shaper; and
   means for tilling a row of a field.

2. The minimum tillage implement of claim 1, wherein:

said lower portion of said shaper comprises a substantially vertical blade portion;

said shaper further comprises a forwardly-slanting dirt-deflecting portion; and said shaper is substantially V-shaped in plan.

3. The minimum tillage implement of claim 1, further comprising:

attachment means for attaching the implement to a tool bar of a planter device;

means for adjusting depth of tilling; and means for adjusting depth of topping.

4. The minimum tillage implement of claim 3, further comprising:

means for adjusting roll of the shaper to allow moving of dirt from one side of the row to another side of the row.

5. The minimum tillage implement of claim 4, wherein:

means for adjusting depth of topping and the means for adjusting roll of the shaper comprise jacking means attached to said shaper and said attachment means.

6. The minimum tillage implement of claim 1, wherein said means for tilling a row of a field comprises:

a reel having a predetermined number of blades spaced substantially evenly about a shaft;

tabs interposed between adjacent blades, each tab being substantially equal in width to and substantially shorter in length than each of said blades.

7. A minimum tillage implement comprising:

a shaper for topping a row of a field, said shaper having a lower portion for engaging a row of a field, a forwardly-slanting dirt-deflecting portion, and a top edge, said shaper being substantially V-shaped in plan;

a lip portion adjacent said top edge of said shaper, said lip portion extending substantially perpendicularly from said top edge and extending forwardly of said shaper a sufficient distance to prevent dirt from going over the top edge of said shaper;

means, for tilling a row of a field, comprising a reel having a predetermined number of blades spaced substantially evenly about a shaft and tabs interposed between adjacent blades, each tab being substantially equal in width to and substantially shorter in length than each of said blades;

attachment means for attaching the implement to a tool bar of a planter device;

means for adjusting depth of tilling; and means for adjusting depth of topping and for adjusting roll of the shaper, comprising jacking means attached to said shaper and said attachment means.

* * * * *